US006618712B1

(12) United States Patent
Parker et al.

(10) Patent No.: US 6,618,712 B1
(45) Date of Patent: Sep. 9, 2003

(54) PARTICLE ANALYSIS USING LASER ABLATION MASS SPECTROSCOPY

(75) Inventors: Eric P. Parker, Albuquerque, NM (US); Stephen E. Rosenthal, Tijeras, NM (US); Michael W. Trahan, Albuquerque, NM (US); John S. Wagner, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/321,906

(22) Filed: May 28, 1999

(51) Int. Cl.[7] .................................................. G06N 3/02

(52) U.S. Cl. ............................ 706/15; 356/336; 422/91

(58) Field of Search ........................... 706/15; 356/336; 210/745; 422/91

(56) References Cited

U.S. PATENT DOCUMENTS

| | | | | |
|---|---|---|---|---|
| 5,411,709 A | * 5/1995 | Furuki et al. | ................. | 422/91 |
| 5,480,562 A | * 1/1996 | Lemelson | ................... | 210/745 |
| 5,602,886 A | * 2/1997 | Gross et al. | ................ | 376/253 |
| 5,818,583 A | * 10/1998 | Sevick-Muraca et al. | ... | 356/336 |

OTHER PUBLICATIONS

Nakata, Y.; Muramoto, J.; Okada, T.; Maeda, M., Investigation Of Si Nano–particle Formation Process In Laser–ablated Si Plume Using Imaging Laser Spectroscopy Lasers and Electro–Optics, 1997. CLEO/Pacific Rim '97., Pacific Rim Conference on, 1997 Page(s).*

Kim, M.-K.; Ishii, H.; Takao, T.; Oki, Y.; Maeda, M., Analysis of trace element in solids by using laser ablation atomic fluorescence spectroscopy, Lasers and Electro–Optics, 2000. (CLEO 2000). Conference on , 2000, pp.: 512–513.*

Ishii, T., Excimer laser ablation of biomaterials: the contribution of water in collagen films, Lasers and Electro–Optics, 1999. CLEO/Pacific Rim '99. The Pacific Rim Conference on , vol.: 3, 1999, pp.: 622–623 vol. 3.*

Nakamura, M.; Ohmi, M.; Haruna, M., Time–gated spectroscopic study of laser–ablation plume of biological tissue, Lasers and Electro–Optics, 1999. CLEO/Pacific Rim '99. The Pacific Rim Conference on, vol.: 1, 1999, pp., 45–46, vol. 1.*

Morishita, K.; Higuchi, Y.; Okada, T., Visualization of expanding laser–ablation plume by a proposed frequency up–converted infrared spectroscopic imaging, Lasers and Electro–Optics, 1999. CLEO/Pacific Rim '99. The Pacific Rim Conference on, vol.: 2, 19.*

Chuck, R.S.; Cohen, D.; McDonnell, P.J.; Grundfest, W.S., 193 nm excimer laser–induced fluorescence spectroscopy during corneal ablative surgery, LEOS '99. IEEE Lasers and Electro–Optics Society 1999 12th Annual Meeting, vol.; 1, 1999, pp.: 218–219.*

(List continued on next page.)

*Primary Examiner*—Wilbert L. Starks, Jr.
(74) *Attorney, Agent, or Firm*—V. Gerald Grafe; George H. Libman

(57) ABSTRACT

The present invention provides a method of quickly identifying bioaerosols by class, even if the subject bioaerosol has not been previously encountered. The method begins by collecting laser ablation mass spectra from known particles. The spectra are correlated with the known particles, including the species of particle and the classification (e.g., bacteria). The spectra can then be used to train a neural network, for example using genetic algorithm-based training, to recognize each spectra and to recognize characteristics of the classifications. The spectra can also be used in a multivariate patch algorithm. Laser ablation mass specta from unknown particles can be presented as inputs to the trained neural net for identification as to classification. The description below first describes suitable intelligent algorithms and multivariate patch algorithms, then presents an example of the present invention including results.

7 Claims, 9 Drawing Sheets

OTHER PUBLICATIONS

Smith, B. et al., Measurements of Uranium Isotope Ratio in Solid Samples by Laser Ablation and Diode Laser Induced Fluorescence Spectrometry, ISAS, Dortmund, Germany, 1998.*

Montana, David J., Neural Network Weight Selection Using Genetic Algorithms in the text Intelligent Hybrid Systems, edited by Goonatilake, Suran et al, John Wiley and Sons, 1995, pp. 85–104.*

Nakata, Y.; Muramoto, J.; Okada T.; Maeda, M., Investigation Of Si Nano–particle Formation Process In Laser–ablated Si Plume Using Imaging Laser Spectroscopy, Lasers and Electro–Optics, 1997. CLEO/Pacific Rim '97., Pacific Rim Conference on, 1997 Page(s).*

Kim, M.–K.; Ishii, H.; Takao, T.; Oki, Y.; Maeda, M., Analysis of trace element in solids by using laser ablation atomic fluorescence spectroscopy, Lasers and Electro–Optics, 2000. (CLEO 2000). Conference on , 2000, pp.: 512–513.*

Griffiths, et al., "The Assessment of Bioaerosols: A Critical Review," *Journal of Aerosol Science 25*, 1425–1458 (1994).

Siinha, et al,: "Analysis of Individual Biological Particles in Air,", Rapid detection and identification of microorganisms, pp. 165–192, Nelson ed., VCH Publishers, Deerfield Beach, FL (1985).

Sinha, et al., "Analysis of Individual Biological Particles by Mass Spectrometry," *International Journal of Mass Spectrometry Ion Processes* 57, 125–133 (1984).

Wood, et al., "Time–of–Flight Mass–Spectrometry Methods for Real–Time Analysis of Individual Aerosol Particles,", *Trends in Analytical Chemistry* 17, 346–356 (1998).

Hardin, "Lasers Help Identify Airborne Particles in Real–Time," *Photonics Spectra* 31, pp. 42 (1997).

Spangler, et al., "Airborne Particle Analysis," *Science* 279, pp. 1996 (1996).

K. R. Spurny, "On the Chemical Detection of Bioaerosols," *Journal of Aerosol Science* 25, pp. 1533–1547 (1994).

W. Eduarda, D. Heederick, "Methods for Quantitative Assessment of Airboen Levels of Noninfectious Microorganisms in Highly Contaminated Work Environments," *American Indistrial Hygiene Association Journal* 59, pp. 113–127 (1998).

M. Krammer, K. Fox, A. Fox, A. Saraf, L. Larsson, "Total and Viable Airborne Bacterial Load in Two Different Agricultural Environments Using Gas Chromatography—Tandem Mass Spectrometry and Culture: A Prototype Study," *American Industrial Hygiene Association Journal* 59, pp. 524–531 (1999).

H. Dillon, P. Heinsohn, J. Miller (Eds), "Field Guide for the Determination of Biological Contaminants in Environmental Samples," *American Industrial Hygiene Association*, Fairfax, VA, (1996).

K. P. Hinz, R. Kaufmann, B. Spengler, "Simultaneous Detection of Positive and Negative Ions from Single Airborne Particles by Real–Time Laser Mass Spectroscopy," *Aerosol Science and Technology* 24, pp. 233–242 (1996).

Trahan, et al, "The Use of Intelligent Algorithms in Multispectral UV Analysis," CALIOPE Program, *4th Interim Technical Review Proceedings*, vol. 1, 25, (1997).

Wagner et al, "How Intelligent Chemical Recognition Benefits from Multivariate Analysis and Genetic Optimation," *Computers in Physics* 10, pp. 114–117 (1995).

Gieray, et al, "Real–Time Detection of Individual Airborne Bacteria," *Journal of Microbiological Methods* 29, pp. 191–199 (1997).

* cited by examiner

Fig. 1A Average Fitness
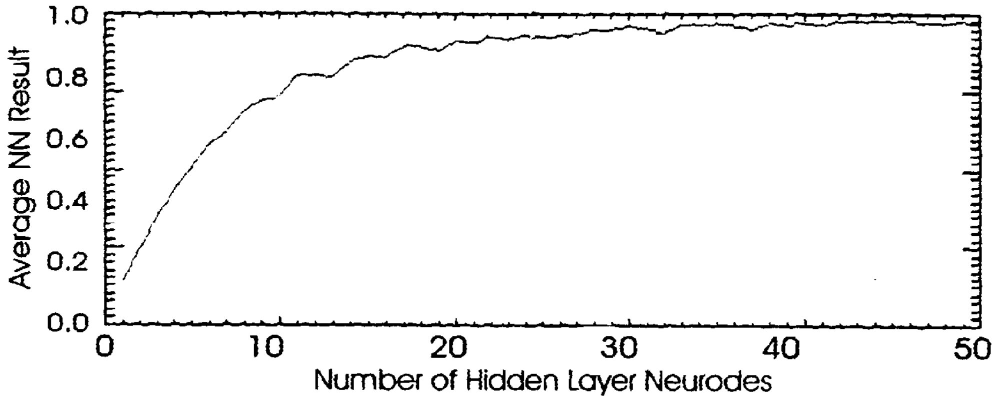
Fig. 1B NN Training Case Results
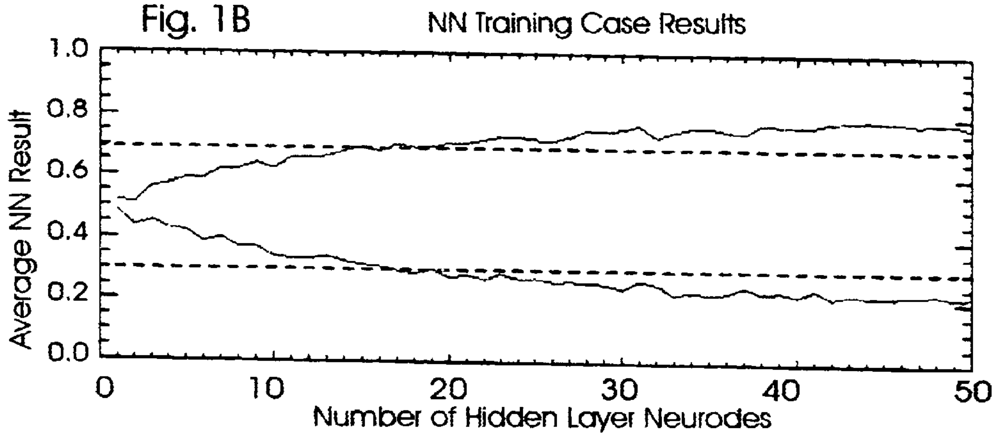
Fig. 1C NN Generalization Results
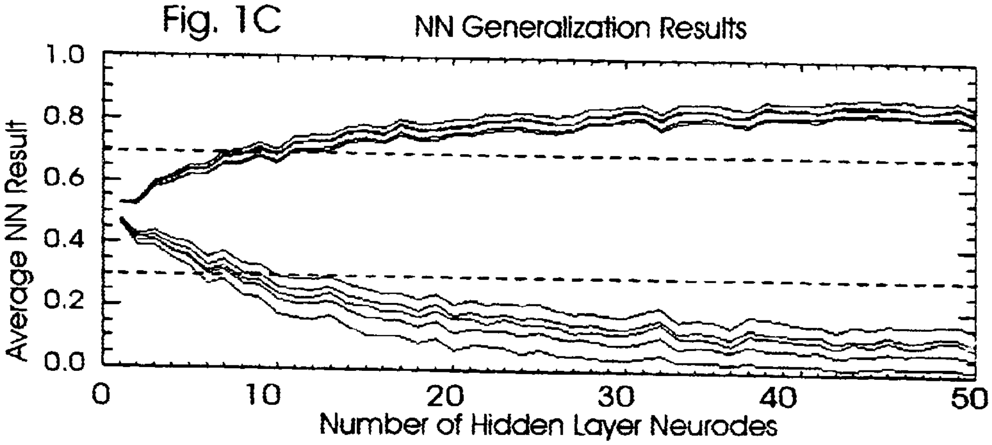

Table I: Neural Net Training Results for Negative Ion Data

| Species (abbreviation) | NN Estimate |
|---|---|
| Azobacter vinelandii (avin) | 0.7811 |
| Bacillus subtilis (bsubt) | 0.8008 |
| Escherichia coli (ecoli) | 0.7992 |
| Enterobacter aerogenes (enter) | 0.7743 |
| Micrococcus lysodeikticus (micro) | 0.8229 |
| *Bacillus subtilis spores (spore) | 0.7311 |
| Ambrosia trifida (ambtri) | 0.1811 |
| Artemisia tridentata (arttri) | 0.1261 |
| Betula alba (betalb) | 0.1642 |
| Dactylis glomerata (dacglo) | 0.2167 |
| Juglans nigra (juglan) | 0.0733 |
| *Agrostis alba (grass) | 0.2869 |

*Species used in NN training

Fig. 4

Table II: Neural Net Training Results for Positive Ion Data

| Species (abbreviation) | NN Estimate |
|---|---|
| Azobacter vinelandii (avin) | 1.0000 |
| *Bacillus subtilis (bsubt) | 0.9821 |
| Escherichia coli (ecoli) | 1.0000 |
| Enterobacter aerogenes (enter) | 0.9086 |
| Micrococcus lysodeikticus (micro) | 0.7137 |
| Bacillus subtilis spores (spore) | 0.8747 |
| Ambrosia trifida (ambtri) | 0.0638 |
| *Artemisia tridentata (arttri) | 0.0000 |
| Betula alba (betalb) | 0.0477 |
| Dactylis glomerata (dacglo) | 0.0000 |
| *Juglans nigra (juglan) | 0.0000 |
| Agrostis alba (grass) | 0.1058 |

Species used in NN training

Fig. 5

| Micro Negative Ion Results – Interfering Species and Relative Peak Heights | | | | |
|---|---|---|---|---|
| Set 1 | Bsubt (0.8860) | Enter (0.9079 | Spore (0.9956) | Peru (0.399) |
| Set 2 | Bsubt (1.3390) | Enter (0.9718) | Spore (1.3390) | 4350b (0.2373) |

Fig. 10

| Samples Studied | | |
|---|---|---|
| Bacteria | Pollen | Particulate Matter |
| *Azobacter vinelandii* (avin) | *Ambrosia trifida* (ambtri) | NIST 1645 River Sediment (1645) |
| *Bacillus subtilis* (bsubt) | *Artemisia tridentata* (arttri) | NIST 4350b River Sediment (4350b) |
| *Escherichia coli* (ecoli) | *Betula alba* (betalb) | NIST 8407 River Sediment (8407) |
| *Enterobacter aerogenes* (enter) | *Dactylis glomerata* (dacglo) | NIST 2710 Montana Soil (Mont) |
| *Micrococcus lysodeikticus* (micro) | *Juglans nigra* (juglan) | NIST Peruvian Soil (Peru) |
| *Bacillus subtilis spores* (spore) | *Agrostis alba* (grass) | NIST 1648 Urban Particulate (Urbanp) |

Fig. 6

| Parameters of the Genetic Alogorithm Used to Train a Population of Neural Nets | | |
|---|---|---|
| GA Parameter | Positive Ion Data | Negative Ion Data |
| GA Type | Steady State | Steady State |
| Population Size | 64 | 64 |
| Crossover Method | One Point | Even/Odd |
| Crossover Probability | 0.9 | 0.9 |
| Fitness Scaling Method | Linear | Sigma Truncation |
| Mate Selection Method | Roulette Wheel | Rank |
| Mutation Method | Replacement | Replacement |
| Mutation Probability | 0.01 | 0.01 |

Fig. 12

*Bacillus globigii* spores
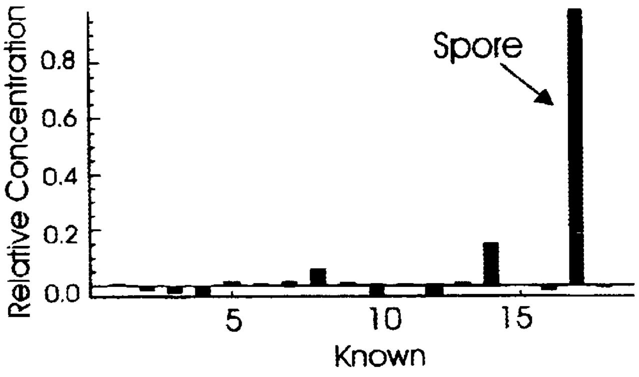
Fig. 7A
*Dactylis glomerata* pollen
Fig. 7B
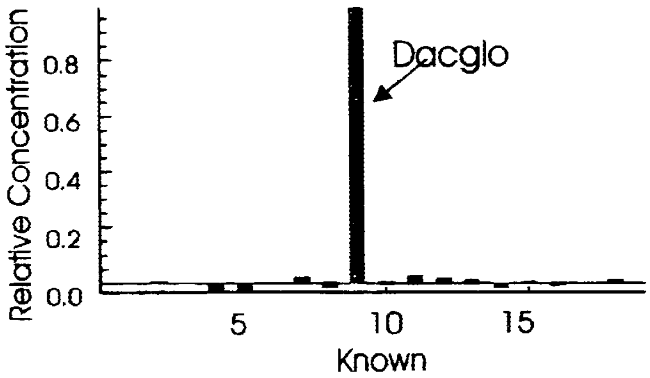
NIST 8407 River Sediment Particles
Fig. 7C
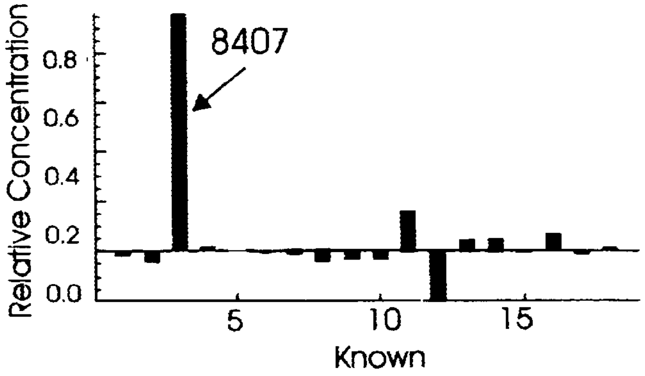

Table Two: MPA Results

| Species | Negative Ion Spectra | | | Positive Ion Spectra | | | Combined Spectra | |
|---|---|---|---|---|---|---|---|---|
| | Set 1 | Set 2 | | Set 1 | Set 2 | | Set 1 | Set2 |
| Avin | A | A | | A | A | | A | A |
| Bsubt | B | B | | C | B | | B | C |
| Ecoli | A | A | | A | A | | A | A |
| Enter | B | B | | A | A | | A | A |
| Micro | D | F | | A | A | | A | A |
| Spore | B | B | | A | A | | A | A |
| | | | | | | | | |
| Ambtri | B | A | | A | A | | A | A |
| Arttri | B | A | | A | A | | A | A |
| Betalb | B | B | | A | A | | A | A |
| Dacglo | A | B | | A | A | | A | A |
| Juglan | C | C | | A | A | | A | A |
| Grass | A | A | | A | A | | A | A |
| | | | | | | | | |
| 1645 | A | A | | A | A | | A | A |
| 4350b | C | A | | A | B | | A | B |
| 8407 | B | A | | A | B | | A | A |
| Mont | C | A | | A | A | | A | A |
| Peru | A | B | | B | A | | A | A |
| Urbanp | C | B | | B | A | | A | A |

Column Headings:

For each of Set 1 and Set 2: The datasets are each split in half, with the average of the first half being used as the known and the average of the second half being used as the unknown.

Criteria for evaluating MPA results:

A: All other peaks have a relative height <0.15 of the height of the species peak.

B: All other peaks have a relative height <0.33

C: All other peaks have a relative height <0.67

D: All other peaks have a relative height <1.0

F: The species peak is not the highest peak.

Fig. 9

PARTICLE ANALYSIS USING LASER ABLATION MASS SPECTROSCOPY

This invention was made with Government support under Contract DE-AC04-94AL85000 awarded by the U.S. Department of Energy. The Government has certain rights in the invention.

BACKGROUND OF THE INVENTION

This invention relates to the field of the detection an identification of biological samples, specifically those which are or can be made airborne.

Timely detection and identification of airborne microorganisms is increasingly important due to the concern about weapons of mass destruction based on biological agents. Infectious environments such as hospitals, and environmental hazards such as "sick" buildings also make the ability to detect and identify airborne microorganisms important.

Traditional methods used to identify bioaerosols generally involve collecting samples on culture media and identifying them via colony growth and response to various agents. See, e.g., Griffiths et al. "The assessment of bioaerosols: a critical review", Journal of Aerosol Science 25, 1425–1458 (1994). Traditional methods therefore can be unsuitable for time-critical applications. A technique that shows promise involves the use of highly specific reactions such as antigen-antibody reactions or the hybridization of gene probes to DNA or RNA. Another promising technique involves the use of conventional methods of chemical analysis. Single particle techniques using conventional analysis are primarily based on mass spectrometry and optical emission spectrometry. See, e.g., Sinha et al. "Analysis of individual biological particles in air", Rapid detection and identification of microorganisms pp. 165–192, Nelson ed., VCH Publishers (1985); Sinha et al. "Analysis of individual biological particles by mass spectrometry", International Journal of Mass Spectrometry Ion Processes 57, 125–133 (1984); Wood et al. "Time-of-Flight Mass-Spectrometry Methods for Real-Time Analysis of Individual Aerosol Particles", Trends in Analytical Chemistry 17, 346–356 (1998); Hardin "Lasers help identify airborne particles in real-time", Photonics Spectra 31, pp. 42 (1997); Spengler et al. "Airborne Particle Analysis", Science 274, pp. 1996 (1996). Spectroscopic methods rely on optical resolution to detect single cells, while mass spectrometric methods rely on particle beam technology to make measurement times shorter than the time between particle events.

Bioaerosol hazards can be posed by unexpected presence of known bioaerosols, and by the presence of unknown bioaerosols. None of the proposed techniques allows robust detection of biaerosols and the classification of unknown bioaerosols based on information concerning known bioaerosols. There accordingly is a need for a method for quickly detecting and identifying bioaerosols, even if the bioaerosol was not previously known.

SUMMARY OF THE INVENTION

The present invention provides a method of quickly identifying bioaerosols by class, even if the subject bioaerosol has not been previously encountered. The method begins by collecting laser ablation mass spectra from particles of known species. The spectra are correlated with the known particles, including the species of particle and the classification (e.g., bacteria). The spectra can then be used to train a neural network, for example using genetic algorithm-based training, to recognize each spectra and to recognize characteristics of the classifications. The spectra can also be used in a multivariate patch algorithm. Laser ablation mass specta from unknown particles can be presented as inputs to the trained neural net, alone or in combination with the multivariate patch algorithm, for identification as to classification. The description below first describes suitable intelligent algorithms and multivariate patch algorithms, then presents an example of the present invention including results.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIG. 1*a* is a plot of the average fitness for a population of neural networks trained on negative ion data as a function of hidden layer neurodes.

FIG. 1*b* is a plot of the neural network results for two training cases as a function of the number of hidden layer neurodes.

FIG. 1*c* is an illustration of the neural network results for all the species not used in training.

FIG. 4 is a listing of numerical results for negative ion data.

FIG. 5 is a listing of numerical results for positive ion data.

FIG. 6 lists species used in an example of the present invention.

FIG. 7(*a,b,c*) is a sample of the output from the multivariate patch algorithm.

FIG. 9 is an illustration of results for individual unknowns.

FIG. 10 is a table of interfering species and their peak heights relative to that of the Micro peak.

FIG. 12 shows the parameters for the genetic algorithms used to train a population of neural networks.

DETAILED DESCRIPTION OF THE INVENTION

Figure 2A:
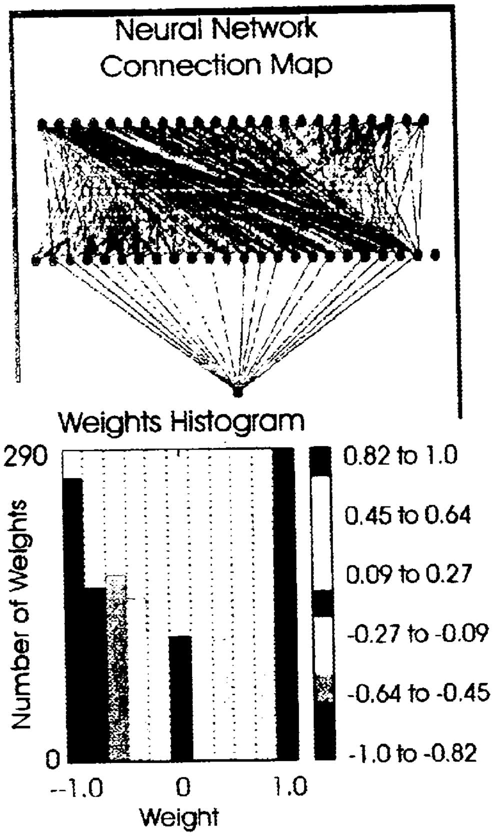
FIGS. 2(*a,b*) is an illustration of neural network training results for negative ion data.

The present invention provides a method of quickly identifying bioaerosols by class if the subject bioaerosol has not been previously encountered, and by species if it has been encountered. The method begins by collecting laser ablation mass spectra from known particles. The spectra are correlated with the known particles, including the species of particle and the classification (e.g., bacteria). The spectra can then be used to train a neural network, for example using genetic algorithm-based training, to recognize each spectra and to recognize characteristics of the classifications. The spectra can also be used in a multivariate patch algorithm to train the system to recognize species with which it has been trained. Laser ablation mass specta from unknown particles can be presented as inputs to the trained neural net, alone for identification as to classification or in combination with the multivariate patch algorithm for identification as to species. The description below first describes suitable intelligent algorithms and multivariate patch algorithms, then presents an example of the present invention including results.

Intelligent Algorithms

Genetic algorithms and neural networks are both based on biological models and have been used in a variety of data analysis applications. Neural networks are based on a simplified model of the mammalian brain. In the model, neurons, consisting of a stoma (base) and numerous synapses (connections to other stoma) are represented by neurodes and their interconnections. Each neurode can receive multiple inputs and can give a single output. The individual input signals can be assigned a relative weight and then summed to give a total weighted input. Individual inputs can either excite the neurode to fire or inhibit the neurode from firing. Excitatory inputs are by convention positive; inhibitory inputs are by convention negative. The output signal from the neurode is computed as the result of a transfer function applied to the weighted sum of the inputs. If the output is above a selected threshold, then the neurode can fire, sending an input to each neurode in the following layer. The transfer function can take many forms, e.g., step functions, ramp functions, and sigmoid functions.

The structure of a neural network can be defined by the way neurodes and connections are arranged. For use with the present invention, a neural network comprising three layers can be suitable. The three layers can comprise an input layer, a middle layer, and an output layer. The middle layer is called a hidden layer because it has no direct connections to the outside world. A fully-connected feed-forward architecture can be used, wherein each neurode in the input layer is connected to each neurode in the hidden layer, and each neurode in the hidden layer is connected to each neurode in the output layer. In this architecture, no neurodes are allowed to send signals to neurodes in preceding layers or in the same layer.

Neural networks are conventionally trained using a supervised training process often called back propagation. Back propagation is suitable for use with the present invention. Training using genetic algorithms can also be suitable.

Genetic algorithms are global optimization methods based on mathematical models of a genetic process. Genetic algorithms can use principles of natural selection and survival of the fittest to drive the evolution of a population of neural networks. During an iteration of the genetic algorithm, each neural network is shown a set of training cases and then ranked according to the accuracy of its responses. Individuals with higher rank are deemed to be more fir than individuals of lower rank, and thus more likely to reproduce.

Each individual neural network contains a set of chromosomes describing its features. In the present invention, the chromosomes can describe the neurodes in each layer and the weights of the connections therebetween. Reproduction occurs-through a process of selection and recombination of chromosomes. Selection favors highly fit individuals, while the least fit are rarely chosen and thus tend to die out. Recombination or crossover takes information from each of two parents and places the mixture into a member of the next generation. Offspring may or may not have higher fitness values than their parents due to the random nature of the crossover processes. As the reproduction and selection processes repeat over multiple generations better chromosomes tend to dominate. The overall fitness of the population accordingly increases and the most promising areas of the search space are explored.

The genetic algorithm can maintain genetic diversity to ensure that the search space is thoroughly explored. The selection/recombination process can foster this, and mutations can be introduced to prevent the solution from converging on a local but not global minimum.

Multivariate Patch Algorithms

A multivariate patch algorithm is a variant of multivariate analysis that was originally developed to minimize the residuals of organized pixel sets or patches. See Trahan et al. "The Use of Intelligent Algorithms in Multispectral UV Analysis", CALIOPE Program $4^{th}$ Interim Technical Review Proceedings, Vol. 1 (1997), incorporated herein by reference, and Wagner et al. "How intelligent chemical recognition benefits from multivariate analysis and genetic optimization", Computers in Physics 10, 114–118 (1995), incorporated herein by reference. The multivariate patch algorithm is conceptually similar to a classical least-squares fit, since it chooses the concentrations of specified known spectra to minimize the residuals between the unknown mixture and the fitted solution. The multivariate patch algorithm extends this approach by minimizing the residuals on pixel sets, which collectively contain the most important features in a particular chemical spectrum. Mathematically, the multivariate patch algorithm computes the residuals between the mixture and a hypothetical solution for all pixels in a patch, then minimizes this residual, or a function of this residual for each patch. After the concentrations are estimated the algorithm then computes an uncertainty estimate derived from the first three terms of the Taylor series expansion of the rate of change of concentration from the unknown mixture, the known chemical database, and the mixture-known (cross product) uncertainty.

EXAMPLE 1

Laser ablation mass spectroscopy was used to collect the spectra discussed below, using method and apparatus like that discussed in Gieray et al. "Real-time detection of individual airborne bacteria", Journal of Microbiological Methods 29, 191–199 (1997), incorporated herein by reference. Airborne particles pass through a collimating inlet system consisting of a capillary and two skimmers separating differentially-pumped chambers before entering the vacuum chamber that houses the ion trap electrodes. Incoming particles are sensed as they pass through two continuous wavelength laser-beams prior to entering the vacuum chamber. A trigger pulse is generated to fire an excimer laser at 308 nm to strike the detected particles as they pass through the center of the ion trap electrodes, after which a mass spectrum of either positive or negative ions is acquired for each particle.

Data were collected for two different classifications of airborne microparticles: bacteria and pollen. Six different examples were studied in each category, for a total of twelve species. The six bacteria species studied were *Aztobacter vinelandii, Bacillus subtilis, Escherichia coli, Enterobacter aerogenes, Micrococcus Iysodeikticus*, and *Bacillus subtilis spores*. The six pollen species studied were *Ambrosia trifida,*

*Artemisia tridentata, Betula alba, Dactylis glimerata, Juglans nigra*, and *Agrostis alba*. Both positive and negative ion data were collected for each species. The dataset for each sample studied (positive or negative) consists of hundreds of mass spectra, each spectrum being generated from a single microparticle. Only a few (one or two) of each type of sample is used in training the neural networks.

A microparticle fragments inside a mass spectrometer in a highly random manner. Accordingly, a number of spectra can be averaged together to get training cases with a recognizable fingerprint. As a result, the data set used to train the neural networks consists of multiple averaged spectra (training cases) for each of the selected bacteria and non-bacteria species. The number of spectra averaged to yield the training spectra is determined empirically, as illustrated in FIGS. 1(*a,b,c*). FIG. 1*a* shows the average fitness for a population of neural networks trained on negative ion data plotted as a function of hidden layer neurodes. As the number increases from 10 to approximately 20 the fitness improves markedly. After about 20 hidden layer neurodes the fitness still increases, but the effect is not as dramatic. FIG. 1*b* shows the neural network results for two training cases plotted as a function of the number of hidden layer neurodes. After training was complete, all the training cases were shown to the population of neural networks and the response calculated. The results cross into the acceptable region somewhere between 15 and 19 hidden layer neurodes. FIG. 1*c* shows the neural network results for all the species not used in training. The results become acceptable at a lower number of hidden layer neurodes, indicating that the training cases were the most difficult to recognize.

The neural networks used in this example comprised three layers: an input layer, one hidden layer, and an output layer. The number of neurodes in the input layer was determined by equation 1.

$$n=(M/Z)/P \qquad \text{equation 1}$$

In equation 1, n is the number of neurodes, MIZ is the range of the mass/charge ratios, and P is the number of points averaged to yield a single input to the neural network. An optimal number of neurodes in the hidden layer can be determined empirically. Using a prime number of neurodes greater than the number of neurodes in the input layer generally yields neural networks that work well. The output layer consists of a single neurode whose output varies between 0 for non-bacteria and 1 for bacteria.

In the example, a genetic algorithm was used to train a population of fully-connected feed-forward neural networks to distinguish between laser ablation mass spectral data from bacteria and non-bacteria. FIG. 12 shows the parameters for the genetic algorithms used to train a population of neural networks. During training, all of the training cases for each of the chosen species are shown to the population of neural networks and the response of each neural network is evaluated. The most fit individuals (those with the most accurate response) have a higher probability of reproducing.

At each generation, the genetic algorithm selects chromosomes (sets of weights for specific connections between neurodes) from each parent and combines them to create new neural networks (offspring). Over the course of many generations (hundreds or thousands, for example) the average fitness of the population increases as neural networks that do no perform well are bred out of the population. The process continues until convergence or until a selected fitness level is reached.

In the example, studying the range M/Z of 80 to 300 was sufficient when using negative ion data. Ten points were binned into each input for a total of 22 neurodes in the input layer. Using 23 neurodes in the hidden layer gave satisfactory results after 10,000 generations. Fifty spectra were averaged for each training case, and a logistic sigmoid was chosen as the neurode activation function. Equation 2 is the functional form of the logistic sigmoid.

$$f(x) = c + \frac{1}{(1 + e^{(-ax+b)})} \qquad \text{equation 2}$$

$$a = 1; \quad b = 1; \quad c = 0$$

Training neural networks using positive ion data was more difficult in the example. A simple ramp function as in Equation 3 was found to be a suitable activation function. The neural networks were not able to generalize when trained using a logistic sigmoid. M/Z of 40 to 370 and averaging 75 spectra per training case were found to be suitable. Five points were binned into each input, and the range M/Z of 56–57 was set to zero. The input layer contained 66 neurodes, and the hidden layer contained 41 neurodes.

$$x<c: f(x)=a$$

$$x>d: f(x)=b$$

$$\text{else}: f(x)=a+\{(x-c)(b-a)\}/(d-c)$$

$$a=0; b=1; c=0; d=1 \qquad \text{equation 3}$$

After training the neural network population, the sets of averaged spectra for the species not used in training were submitted to the neural networks and the response evaluated. An average response for a bacterial response of over 0.7 was considered successful. An average response to a non-bacterial sample of less the 0.3 was considered successful.

Neural networks working with negative ion data were able to distinguish five new bacteria species from five new non-bacteria (pollen) species when trained with a single bacterial sample and a single pollen sample. Similar success was obtained working with positive ion data. Numerical results are plotted in FIGS. 2(*a,b*) and FIGS. 3(*a,b*). The results are shown in FIG. 4 for negative ion data and FIG. 5 for positive ion data. Species marked with an asterisk in the tables are the species used to train the neural networks.

Figure 2B:
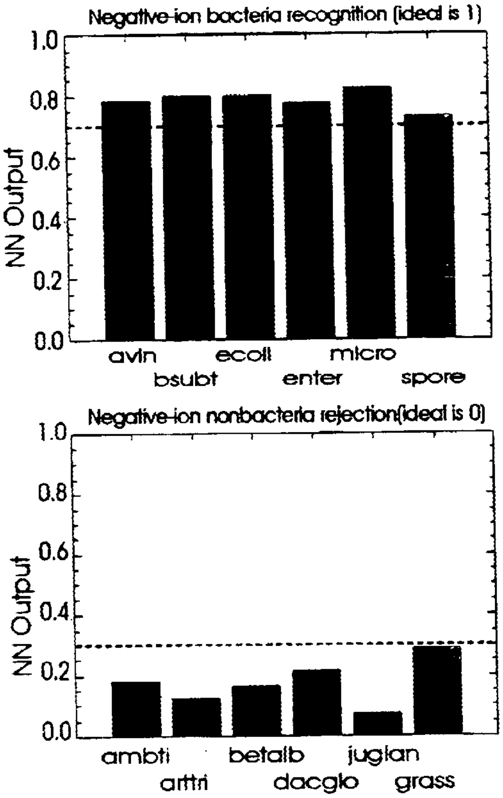

FIGS. 2(*a,b*) shows neural network training results for negative ion data. The architecture of the neural network is illustrated in FIG. 2*a* by the connection map and the weights histogram. The weights are roughly symmetrically distributed, indicating that the neural networks have been through enough generations to become well-organized. This is also indicated by most of the weights being either positive (excitatory) or negative (inhibitory), with few weights in the vicinity of zero.

Figure 3A:
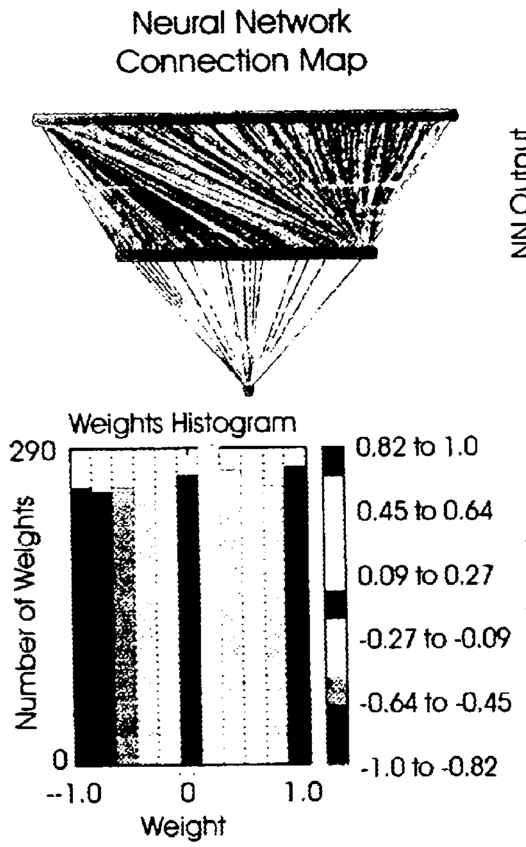
FIGS. 3(*a,b*) is an illustration of neural network training results for positive ion data.
Figure 3B:
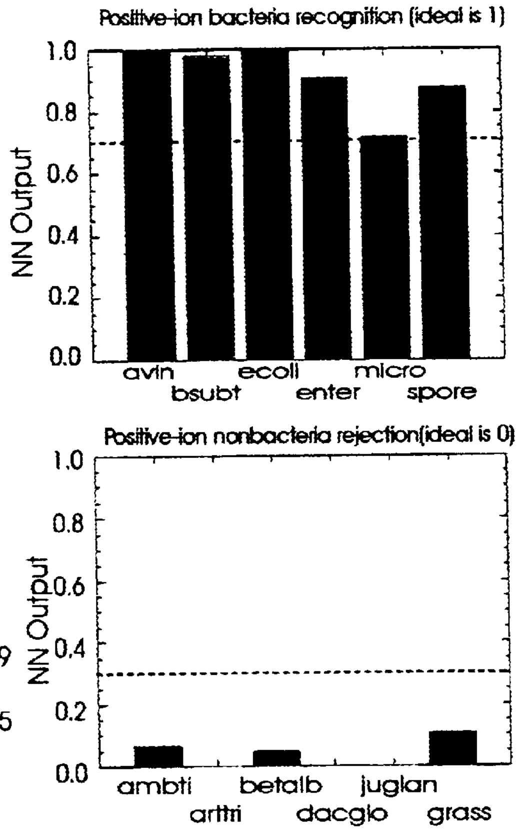
Figure 8A:
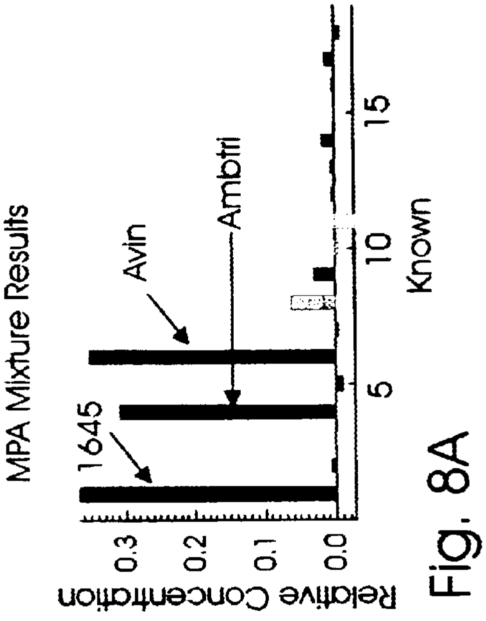
FIGS. 8(*a,b,c,d*) is an illustration of results for a mixture of negative ion spectra from Azotobacter vinelandii, Ambrosia trifida, and NIST 1645 River Sediment.
Figure 8B:
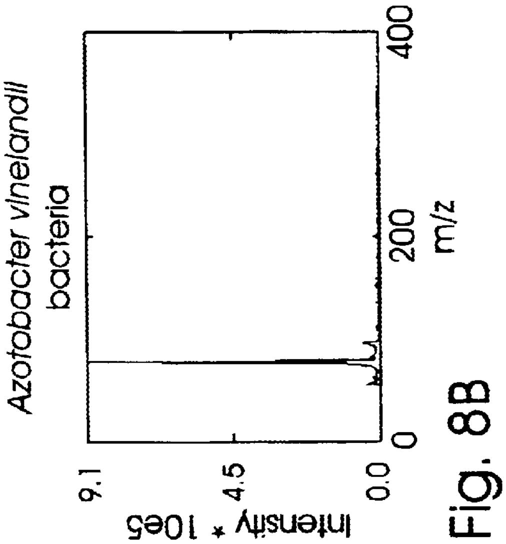
Figure 8C:
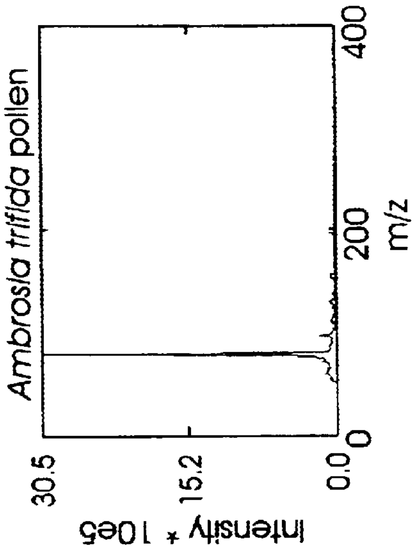
Figure 8D:
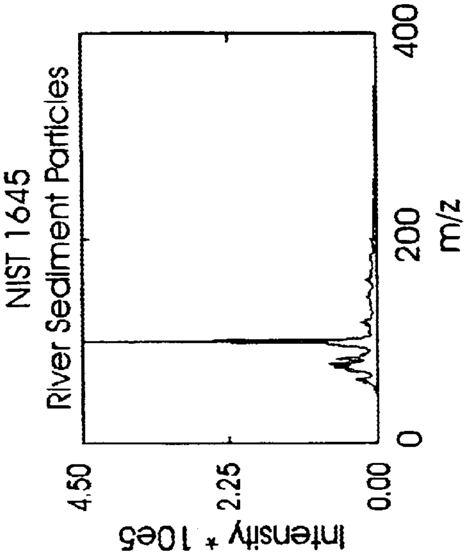
Figure 11A:
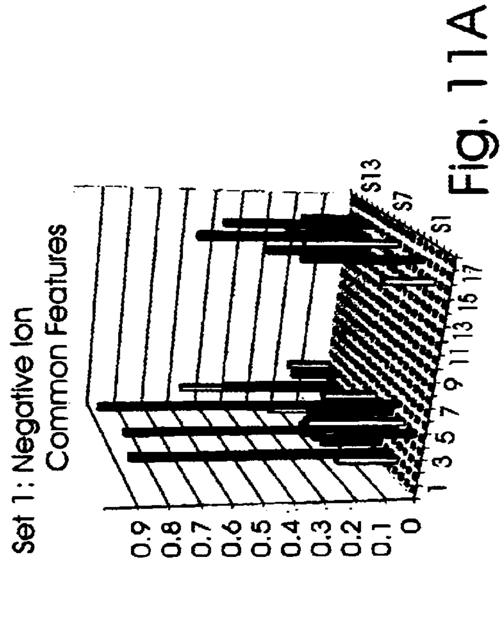
FIGS. 11 (*a,b,c,d*) is an illustration of common features of the results.
Figure 11B:
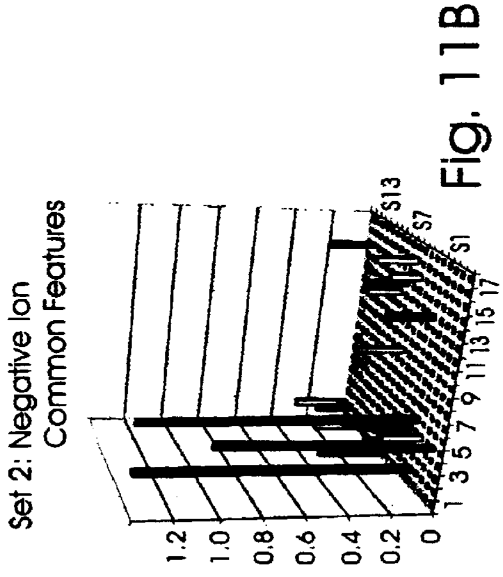
Figure 11C:
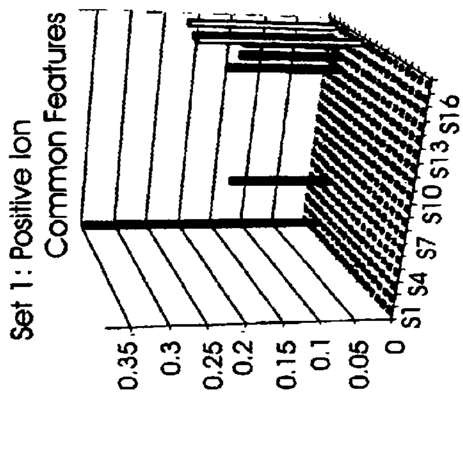
Figure 11D:
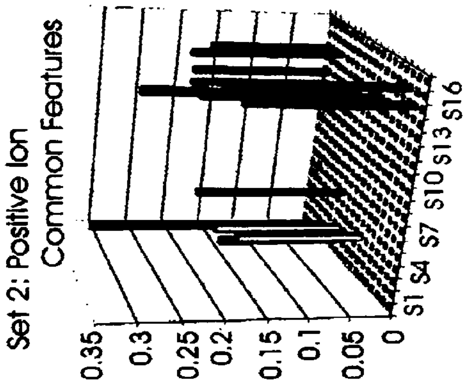

FIGS. 3(*a,b*) shows neural network training results for positive ion data. The number of connections with inhibitory and excitatory weights are approximately identical, indicating that the neural networks are not as well-organized as those trained on negative ion data.

EXAMPLE 2

Laser ablation mass spectroscopy was used to collect the spectra discussed below, using method and apparatus like that discussed previously. Airborne particles pass through a collimating inlet system consisting of a capillary and two skimmers separating differentially-pumped chambers before entering the vacuum chamber that houses the ion trap electrodes. Incoming particles are sensed as they pass through two continuous wavelength laser beams prior to entering the vacuum chamber. A trigger pulse is generated to fire an excimer laser at 308 nm to strike the detected particles as they pass through the center of the ion trap electrodes, after which a mass spectrum of either positive or negative ions is acquired for each particle.

In this example eighteen different samples were studied: six bacteria, six pollen, and six particulates. The species are listed in FIG. 6. A dataset for each species can comprise hundreds of mass spectra, each spectrum generated from a single microparticle. Two complete datasets were obtained for each bacteria and particulate, and one dataset for each of the pollens. Two complete sets of evaluations are discussed, one for each set of the bacteria and particulate. The same pollen data is used in each.

The individual datafiles from the mass spectrometer can be averaged to accommodate the highly random manner in which a microparticle fragments under laser ablation. Each set of data analyzed accordingly comprised a set of eighteen known spectra and eighteen unknown spectra. Each known spectrum was obtained by averaging the first half of the files in a dataset for a particular species, while the corresponding unknown spectrum is the average of the second half of the files in the same dataset. Once the known and unknown spectra had been computed, a multivariate patch algorithm was used to analyze the positive spectra, the negative spectra, and a combination of the positive and negative spectra. Consequently each set of results contain results for eighteen positive ion spectra, eighteen negative spectra, and eighteen combined spectra. A sample of the output from the multivariate patch algorithm is shown in FIGS. 7(*a,b,c*). FIGS. 7(*a,b,c*) shows results using the entire M/Z range as the patch; the height of each peak in the histogram reflects the concentration estimate for that species.

The multivariate patch algorithm was also used to analyze computer created mixtures. A mixture spectrum was taken to be a linear superposition of the spectra from each individual component. As the concentration of each component was taken to be unity, the signal contribution from each component depends on its unique spectral shape. Results are shown in FIGS. 8(*a,b,c,d*) for a mixture of negative ion spectra from *Azotobacter vinelandii, Ambrosia trifida*, and NIST 1645 River Sediment.

Results for individual unknowns are shown in FIG. 9. The criteria used to evaluate the results are based on the relative heights of the component peaks. Relative peak heights are computed by dividing the height of each component peak by the height of the peak representing the species in question. Only positive peaks are included in the evaluation, since negative peaks represent non-physical results (negative concentrations). The criteria for the results in FIG. 9 are given at the bottom thereof. In the criteria the peak belonging to the known spectrum corresponding to the unknown being analyzed is referred to as the species peak.

In FIG. 9 the majority of species are correctly identified. In the first set of results the multivariate patch algorithm correctly identified all 18 negative ion spectra, all 18 positive ion spectra, and all 18 combined ion spectra. In the second set of results the multivariate patch algorithm correctly identified 17 of 18 negative ion spectra, all 18 positive ion spectra, and all 18 combined ion spectra. Combining positive and negative spectra yielded even better results. Examining Micro, the one negative ion case where the results were either unsatisfactory or wrong, the major part of the interference if due to another bacterium. The interfering species and their peak heights relative to that of the Micro peak are shown in FIG. 10.

Common features of the results illuminate some interesting trends, highlighted in FIGS. 11 (*a,b,c,d*). For example, in both sets of results the negative ion spectra show a number of features common to both bacteria and soil samples (FIG. 11*a*). In contrast, there is only one instance of a common feature between either a bacterium or particle and a pollen (FIG.11*b*). Even in the case of the set 2 results for Bsubt, though, the common feature with Dacglo is comparatively weak. Even individual pollens do not appear to have common features; rather, they share features with the bacteria and particulate samples.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

What is claimed is:

1. A method of identifying an unknown particle as to class, where each class comprises more than one species, comprising:

a) generating a trained neural network by:
   - i) generating a laser ablation mass spectrum for each of a plurality of particles of known class and species;
   - ii) correlating each spectrum with the species of the known particle and the identity of a class to which the species belongs;
   - iii) training a neural network with the spectrum, species and class information to distinguish among the classes;

b) generating a laser ablation mass spectrum for an unknown particle;

c) using the trained neural network to determine whether the spectrum of the unknown particle correlates with any class identified in the training, even if the species of the unknown particle was not used to train the neural network.

2. The method of claim 1, further comprising the step of determining whether the unknown particle correlates with any species using the neural network.

3. The method of claim 1, wherein the step of training a neural network with the spectrum, species, and class information comprises using genetic algorithms to train a population of neural networks.

4. The method of claim 1, wherein the neural network comprises a fully connected feed-forward neural network.

5. The method of claim 4, wherein the neural network comprises an input layer, a hidden layer, and an output layer.

6. The method of claim 1, further comprising the step of determining whether the unknown particle correlates with any species using a multivariate patch algorithm.

7. The method of claim 6, further comprises using a genetic algorithm to select the patch for the multivariate patch algorithm.

* * * * *